(12) United States Patent
Hada et al.

(10) Patent No.: US 8,775,468 B2
(45) Date of Patent: Jul. 8, 2014

(54) METHOD AND SYSTEM FOR PROVIDING PATH-LEVEL ACCESS CONTROL FOR STRUCTURED DOCUMENTS STORED IN A DATABASE

(75) Inventors: Satoshi Hada, Tokyo (JP); Michiharu Kudo, Kamakura (JP); Naishin Seki, Zama (JP); Akihiko Tozawa, Tokyo (JP); Robbert C. Van der Linden, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/651,691

(22) Filed: Aug. 29, 2003

(65) Prior Publication Data

US 2005/0076030 A1     Apr. 7, 2005

(51) Int. Cl.
*G06F 17/30* (2006.01)
*G06F 21/62* (2013.01)

(52) U.S. Cl.
CPC .................... *G06F 21/6227* (2013.01)
USPC ........... 707/783; 707/694; 707/713; 707/782; 707/785

(58) Field of Classification Search
CPC ............ G06F 21/6227; G06F 21/6218; G06F 2221/2141; G06F 2221/2145; G06F 2221/2113; G06F 21/6245; H04L 63/101; H04L 41/28; H04L 41/024
USPC ............. 707/1, 9, 101, 103, 110, 3, 100, 102, 707/713, 783, 784, 785, 694, 782
See application file for complete search history.

(56) References Cited

U.S. PATENT DOCUMENTS

| 4,907,151 A | 3/1990 | Bartlett |
| 5,193,184 A | 3/1993 | Belsan et al. |
| 5,283,830 A | 2/1994 | Hinsley et al. |

(Continued)

FOREIGN PATENT DOCUMENTS

| EP | 0 992 873 | 4/2000 |
| WO | WO 03/030031 | 4/2003 |
| WO | WO/2004/036417 | 4/2004 |

OTHER PUBLICATIONS

E. Damiani, S. De Capitani di Vimercati, S. Paraboschi. P. Samarati, "A Fine-Grained Access Control System for XML Documents". ACM Transactions on Information and System Security, vol. 5, No. 2, pp. 169-202. Published May 2002.*

(Continued)

*Primary Examiner* — Fred I Ehichioya
*Assistant Examiner* — Dangelino Gortayo
(74) *Attorney, Agent, or Firm* — Sawyer Law Group, P.C.

(57) ABSTRACT

An improved method and system for providing path-level access control to a structured document in a collection stored in a database, where the structured document includes a plurality of nodes is disclosed. The method includes the steps of providing an access control policy for the collection, where the access control policy comprises a plurality of access control rules, generating a path for each node of the plurality of nodes in the document, and generating for each path associated with a node a corresponding value expression based on at least one access control rule of the plurality of access control rules. According to the method and system of the present invention, the corresponding value expression is utilized during access control evaluation to determine whether a user is allowed to access a node in the structured document.

26 Claims, 6 Drawing Sheets

(56) References Cited

U.S. PATENT DOCUMENTS

| | | | |
|---|---|---|---|
| 5,412,807 A | 5/1995 | Moreland | |
| 5,561,786 A | 10/1996 | Morse | |
| 5,644,776 A | 7/1997 | DeRose et al. | |
| 5,652,858 A | 7/1997 | Okada et al. | |
| 5,671,403 A | 9/1997 | Shekita et al. | |
| 5,673,334 A | 9/1997 | Nichani et al. | |
| 5,758,361 A | 5/1998 | Van Hoff | |
| 5,787,449 A | 7/1998 | Vulpe et al. | |
| 5,878,415 A | 3/1999 | Olds | |
| 5,893,086 A | 4/1999 | Schmuck et al. | |
| 5,920,861 A | 7/1999 | Hall et al. | |
| 5,995,952 A | 11/1999 | Kato | |
| 6,044,373 A | 3/2000 | Gladney et al. | |
| 6,081,810 A | 6/2000 | Rosenzweig et al. | |
| 6,085,193 A | 7/2000 | Malkin et al. | |
| 6,101,558 A | 8/2000 | Utsunomiya et al. | |
| 6,236,996 B1* | 5/2001 | Bapat et al. | 707/9 |
| 6,237,099 B1 | 5/2001 | Kurokawa | |
| 6,249,844 B1 | 6/2001 | Schloss et al. | |
| 6,308,173 B1* | 10/2001 | Glasser et al. | 707/9 |
| 6,334,130 B1 | 12/2001 | Tada et al. | |
| 6,336,114 B1 | 1/2002 | Garrison | |
| 6,366,934 B1 | 4/2002 | Cheng et al. | |
| 6,381,602 B1 | 4/2002 | Shoroff et al. | |
| 6,421,656 B1 | 7/2002 | Cheng et al. | |
| 6,438,576 B1 | 8/2002 | Huang et al. | |
| 6,457,103 B1 | 9/2002 | Challenger et al. | |
| 6,480,865 B1 | 11/2002 | Lee et al. | |
| 6,487,566 B1 | 11/2002 | Sundaresan | |
| 6,502,101 B1 | 12/2002 | Verprauskus et al. | |
| 6,519,597 B1 | 2/2003 | Cheng et al. | |
| 6,584,458 B1 | 6/2003 | Millett et al. | |
| 6,631,371 B1* | 10/2003 | Lei et al. | 707/4 |
| 6,658,652 B1 | 12/2003 | Alexander et al. | |
| 6,798,776 B1 | 9/2004 | Cheriton et al. | |
| 6,820,082 B1* | 11/2004 | Cook et al. | 707/9 |
| 6,836,778 B2 | 12/2004 | Manikutty et al. | |
| 6,853,992 B2 | 2/2005 | Igata | |
| 6,901,410 B2 | 5/2005 | Marron et al. | |
| 6,922,695 B2 | 7/2005 | Skufca et al. | |
| 6,938,204 B1 | 8/2005 | Hind et al. | |
| 6,944,184 B1* | 9/2005 | Miller et al. | 370/467 |
| 6,947,945 B1 | 9/2005 | Carey et al. | |
| 6,959,416 B2 | 10/2005 | Manning et al. | |
| 7,016,915 B2 | 3/2006 | Shanmugasundaram et al. | |
| 7,020,653 B2* | 3/2006 | Idicula et al. | 709/203 |
| 7,031,962 B2* | 4/2006 | Moses | 707/9 |
| 7,043,487 B2 | 5/2006 | Krishnamurthy et al. | |
| 7,308,704 B2* | 12/2007 | Vogel et al. | 726/2 |
| 7,353,222 B2 | 4/2008 | Dodds et al. | |
| 7,478,337 B2 | 1/2009 | Kodosky et al. | |
| 7,493,603 B2 | 2/2009 | Fuh et al. | |
| 7,660,902 B2* | 2/2010 | Graham et al. | 709/229 |
| 7,721,193 B2* | 5/2010 | Upton | 715/234 |
| 7,756,857 B2 | 7/2010 | Wan | |
| 7,818,666 B2 | 10/2010 | Dorsett, Jr. et al. | |
| 8,250,093 B2* | 8/2012 | Van der Linden | 707/781 |
| 2001/0018697 A1 | 8/2001 | Kunitake et al. | |
| 2002/0038319 A1 | 3/2002 | Yahagi | |
| 2002/0099715 A1 | 7/2002 | Jahnke et al. | |
| 2002/0103829 A1 | 8/2002 | Manning et al. | |
| 2002/0111965 A1 | 8/2002 | Kutter | |
| 2002/0112224 A1 | 8/2002 | Cox | |
| 2002/0123993 A1 | 9/2002 | Chau et al. | |
| 2002/0133484 A1 | 9/2002 | Chau et al. | |
| 2002/0156772 A1 | 10/2002 | Chau et al. | |
| 2002/0156811 A1 | 10/2002 | Krupa | |
| 2002/0169788 A1 | 11/2002 | Lee et al. | |
| 2003/0014397 A1 | 1/2003 | Chau et al. | |
| 2003/0028495 A1 | 2/2003 | Pallante | 705/78 |
| 2003/0204515 A1 | 10/2003 | Shadmon et al. | |
| 2003/0208490 A1 | 11/2003 | Larrea et al. | |
| 2004/0044959 A1 | 3/2004 | Shanmugasundaram et al. | |
| 2004/0128615 A1 | 7/2004 | Carmel et al. | |
| 2004/0193607 A1 | 9/2004 | Kudo et al. | |
| 2004/0243553 A1 | 12/2004 | Bailey | |
| 2005/0015383 A1* | 1/2005 | Harjanto | 707/100 |

OTHER PUBLICATIONS

S. Cho, S. Amer-Yahia, L. Lashmanan, D. Srivastava, "Optimizing the Secure Evaluation of Twig Queries". VLDB '02 Proceedings of the 28$^{th}$ International Conference on Very Large Data Bases, pp. 490-501. Published 2002.*

Chilimbi, Trishui M. et al., "Cache-Conscious Structure Layout," ACM 1999, pp. 1-12.

Park, Sangwon et al., "XML Query Processing Using Signature and DTD," E-Commerce and Web Technologies, Sep. 2-6, 2002, pp. 162-171.

Park, Sangwon et al., "A New Query Processing Technique for XML Based on Signature," IEEE Apr. 18-21, 2001, pp. 22-29.

Park, Sangwon et al., "SigDAQ: an Enhanced XML Query Optimization Technique," The Journal of Systems and Software, No. 61, No. 2, Mar. 15, 2002, pp. 91-103.

Roth, Amir, et al., "Dependence Based Prefetching for Linked Data Structures," ACM 1998, pp. 115-126.

Shuf, Yefim, et al., "Creating and Preserving Locality of Java Applications at Allocation and Garbage Collection Times," ACM 2002, pp. 13-25.

Yang, Siuxi et al., "Speeding Up the Memory Hierarchy in Flat COMA Multiprocessors," IEEE, Feb. 1-5, 1997, pp. 4-13.

E. Damiani, S. De Capitani Di Vimercati, S. Paraboschi, P. Samarati, "A Fine-Grained Access Control System for XML Documents". ACM Transactions on Information and System Security, vol. 5, No. 2, pp. 169-202. Published May 2002.

Masatoshi Yoshikawa et al., "Xrel: A Path-Based Approach to Storage and Retrieval of XML Documents Using Relation Databases," Japan, ACM 2001.

Lin Guo et al., "XRANK: Ranked Keyword Search over XML Documents," ACM, SIGMOD 2003, Jun. 9-12, 2003, San Diego, CA.

V. Christophides et al., "Querying Structured Documents with Hypertext Links using OODBMS," France, ACM 1998.

You-Chin Fuh et al., "Annotated Automation Encoding of XML Schema for High Performance Schema Validation,", filed Apr. 16, 2003, U.S. Appl. No. 10/418,658, pp. 1-61.

Carl-Christian Kanne et al., "Efficient Storage of XML Data," Universitat Mannheim, Germany, Jun. 16, 1999, pp. 1-20.

"Using an XML Query Language to Publish Relational Data as XML," Dossier—ARC919990247, pp. 1-37.

E. Damiani, S. De Capitani Di Vimercati, S. Paraboschi, P. Samarati, "Design and implementation of an access control processor for XML documents". Computer Networks 22 (2000) pp. 59-75. Published Jun. 2000.

* cited by examiner

| ConditionID 502 | Condition Expression 504 |
|---|---|
| C1 | equal($Group, Admin) & xpath(/bib/book[@title= "security"]) |
| C2 | ... |

| Path 602 | Value Expression 604 |
|---|---|
| /bib | [$User='Murata' or $User='Seki' or $User='Tozawa'] |
| /bib/@ver | [$User='Murata'] |
| /bib/text() | [$User='Murata' or $User='Seki'] |
| /bib/book | [($User='Murata' or $User='Tozawa') and not($User='Hada')] |
| /bib/book/text() | [$User='Murata' and not($User='Hada')] |
| /bib/book/@year | [$User='Murata' and not($User='Hada')] |
| /bib/book/title | if !p then [ref(1, ../)] |
| /bib/book/title/text() | if !p then [ref(1, ../../)] |

METHOD AND SYSTEM FOR PROVIDING PATH-LEVEL ACCESS CONTROL FOR STRUCTURED DOCUMENTS STORED IN A DATABASE

FIELD OF THE INVENTION

The present invention relates generally to computer implemented database systems and, more particularly, to a method and system for providing path-level access control for structured documents stored in a database system.

BACKGROUND OF THE INVENTION

Structured documents are documents which have nested structures. Documents written in Extensible Markup Language (XML) are structured documents. XML is quickly becoming the standard format for delivering information over the Internet because it allows the user to design a customized markup language for many classes of structure documents. For example, a business can easily model complex structures such as purchase orders in XML form and send them for further processing to its business partners. XML supports user-defined tabs for better description of nested document structures and associated semantics, and encourages the separation of document content from browser presentation.

As more and more businesses present and exchange data in XML documents, database management systems (DBMS) have been developed to store, query and retrieve these documents which are typically stored on direct access storage devices (DASD), such as magnetic or optical disk drives for semi-permanent. Some DBMSs, known as relational databases, store and query the documents utilizing relational techniques, while other DBMSs, known as native databases, store the documents in their native formats. XML documents are typically grouped into a collection of similar or related documents. Thus, for example, a group of purchase orders can form a collection.

Once a collection of documents is stored in the database, relational or native, it is potentially available to large numbers of users. Therefore, data security becomes a crucial concern. In particular, the DBMS must be able to control, i.e., deny or grant, access to the data by the user. In a conventional relational DBMS where the data is stored in rows and columns in tables, security is generally directed to the table level, i.e., access to a table is controlled. While this may be sufficient for relational data, it is inadequate for controlling access to a collection of XML documents because an XML document stored in the database contains information that is much more diverse than data stored in rows in tables.

Access control for XML documents is fine-grained, that is, access to each node in an XML document is controlled. The term "node" is used in the DOM-sense, which is a standard XML construct well known to those skilled in the art. In that construct, the XML document is represented by a plurality of nodes that form a hierarchical node tree. Each node of the XML document is identified by a path that defines a hierarchical relationship between the node and its parent node(s). Thus, fine-grained access control to the nodes of an XML document is referred to as path-level access control.

For example, if an administrator wanted to limit access to a "salary" node in all documents in a collection "all_employees," the administrator would generate the following statement:

Deny read access on "/employee/salary" in collection "all_employees" to group non-managers This statement would deny access to all salary nodes with path "/employee/salary" in all documents in collection "all_employees." This type of statement is referred to as an access control rule. A set of access control rules directed to a collection of documents is referred to as an access control policy.

While it is possible to perform path-level access control evaluation by utilizing access control rules, such evaluation is relatively expensive because the DBMS must evaluate each access control rule to determine whether a user should be granted or denied access to data in a node. This process becomes prohibitive when the number of access control rules in a policy increases. Nevertheless, the alternative, i.e., coarse-grained access control or table level access control, is unacceptable.

Accordingly, a need exists for an improved method and system for providing path-level access control for structured documents stored in a database. The method and system should be integrated (or capable of being integrated) with an existing database system in order to use the existing resources of the database system. The present invention addresses such a need.

SUMMARY OF THE INVENTION

The present invention is directed to an improved method and system for providing path-level access control to a structured document in a collection stored in a database, where the structured document comprises a plurality of nodes. The method includes providing an access control policy for the collection, where the access control policy comprises a plurality of access control rules, generating a path for each node of the plurality of nodes in the document, and generating for each path associated with a node a corresponding value expression based on at least one of the plurality of access control rules. According to the method and system of the present invention, the corresponding value expression is utilized during access control evaluation to determine whether a user is allowed to access a node in the structured document.

Through the aspects of the present invention, an Access Control mechanism in the DBMS receives the access control policy for the structured document in the collection and generates for each of the paths associated with the nodes in the document a value expression. The value expression is an executable statement which describes the access control rule for that path, i.e., who is granted or denied access to data in that path. Because the value expression is easier to process than the access control policy, access control evaluation and processing is more efficient and faster.

BRIEF DESCRIPTION OF THE DRAWINGS

FIG. 5 illustrates a condition table according to a preferred embodiment of the present invention.

FIG. 6 illustrates a path table according to a preferred embodiment of the present invention.

DETAILED DESCRIPTION

The present invention relates generally to computer implemented database systems and, more particularly, to an improved method and system for providing path-level access control for structured documents stored in a database. The following description is presented to enable one of ordinary skill in the art to make and use the invention and is provided in the context of a patent application and its requirements. Various modifications to the preferred embodiment and the generic principles and features described herein will be readily apparent to those skilled in the art. For example, the following discussion is presented in the context of a DB2® database environment available from IBM® Corporation. It should be understood that the present invention is not limited to DB2 and may be implemented with other database management systems. Thus, the present invention is to be accorded the widest scope consistent with the principles and features described herein.

According to a preferred embodiment of the present invention, a structured document is parsed into a plurality of nodes that form a node tree. Each node is then associated with a path that describes the node's hierarchical relationship to its parent node(s). A translator receives an access control policy for the structured document that comprises at least one access control rule, and generates for each path a corresponding value expression based on the access control policy. The value expression is a simple statement granting or denying access to the node associated with the path. In a preferred embodiment, the value expressions for the structured document are compiled resulting in a set of mini-plans that can be efficiently executed at runtime by the DBMS.

When a user issues a query on a certain node in the structured document, the DBMS navigates to the certain node and evaluates the corresponding value expression, as opposed to the access control rule(s) in the access control policy, to determine whether the user is authorized to access the certain node. Because the value expression is less complex than the access control rule(s), evaluation by the DBMS is more efficient and faster. Moreover, according to another preferred embodiment of the present invention, access control is evaluated during runtime, as opposed to compile time, thereby allowing an administrator to change the access control policy at runtime without having to recompile the query.

Figure 1:
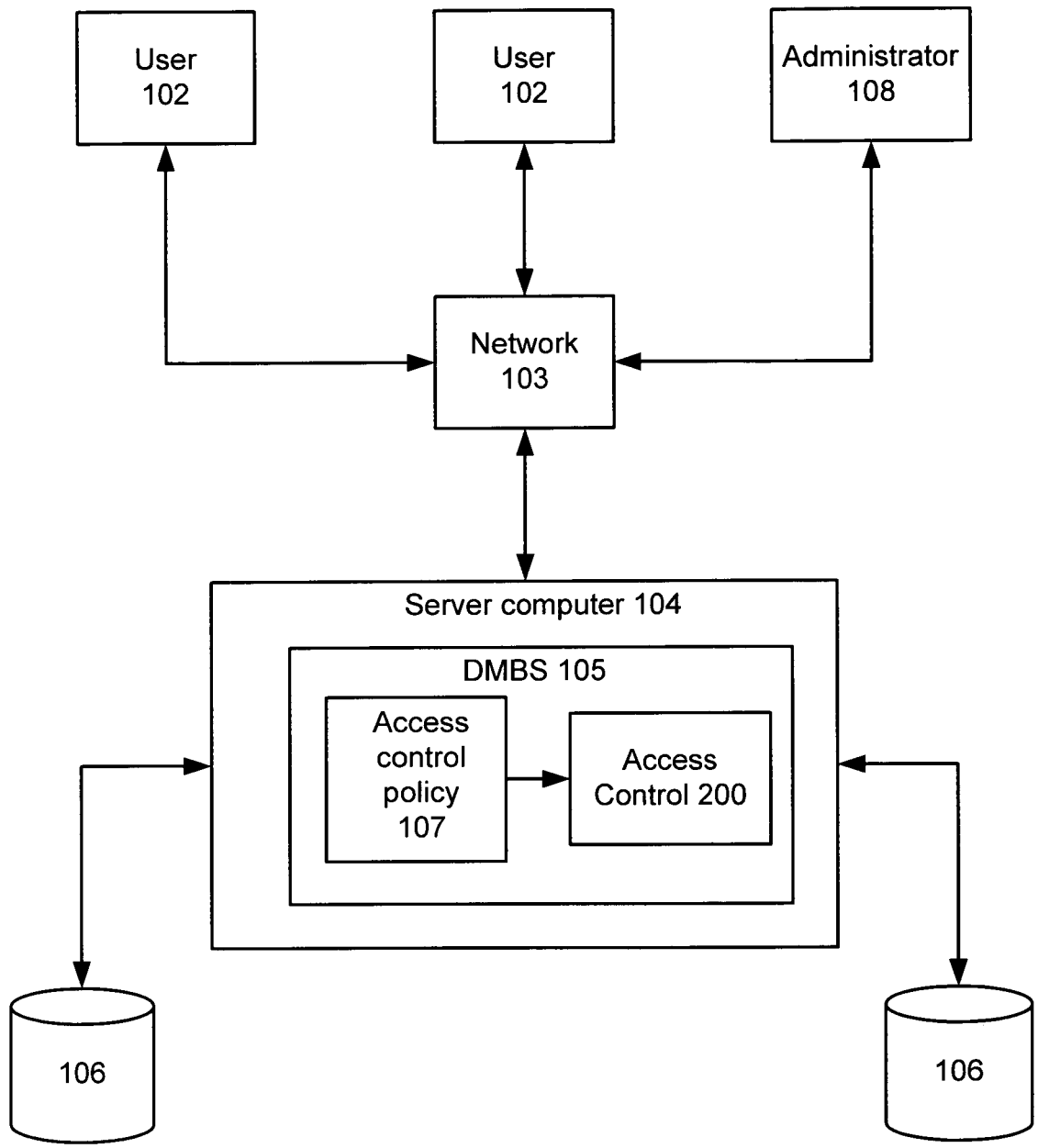
FIG. 1 is a block diagram of an exemplary computer environment for use with the present invention.

To describe further the present invention, please refer to FIG. 1, which is an exemplary computer environment for use with the present invention. In FIG. 1, a typical distributed computer system utilizes a network 103 to connect client computers 102 executing client applications to a server computer 104 executing software and other computer programs, and to connect the server computer 104 to data sources 106. These systems are coupled to one another by various networks, including LANs, WANs, and the Internet. Each client computer 102 and the server computer 104 additionally comprise an operating system and one or more computer programs (not shown).

The server computer 104 uses a data store interface (not shown) for connecting to the data sources 106. The data store interface may be connected to a database management system (DBMS) 105, which supports access to the data store 106.

The DBMS 105 can be a relational database management system (RDBMS), such as the DB2® system developed by IBM Corporation, or it also can be a native XML database system. The interface and DBMS 105 may be located at the server computer 104 or may be located on one or more separate machines. The data sources 106 may be geographically distributed.

The DBMS 105 and the instructions derived therefrom are all comprised of instructions which, when read and executed by the server computer 104 cause the server computer 104 to perform the steps necessary to implement and/or use the present invention. While the preferred embodiment of the present invention is implemented in the DB2® product offered by IBM Corporation, those skilled in the art will recognize that the present invention has application to any DBMS, whether or not the DBMS 105 is relational or native. Moreover, those skilled in the art will recognize that the exemplary environment illustrated in FIG. 1 is not intended to limit the present invention, and that alternative environments may be used without departing from the scope of the present invention.

According to the preferred embodiment of the present invention, the DBMS 105 includes access control policies 107 that are authored by an administrator 108 or some other authorized personnel. Each access control policy 107 describes the security rules pertaining to data stored in the database. The DBMS 105 also comprises an Access Control mechanism 200 that provides path-level access control to structured documents stored on disk. Storing data "on disk" refers to storing data persistently, for example, in the data store 106.

Figure 2:
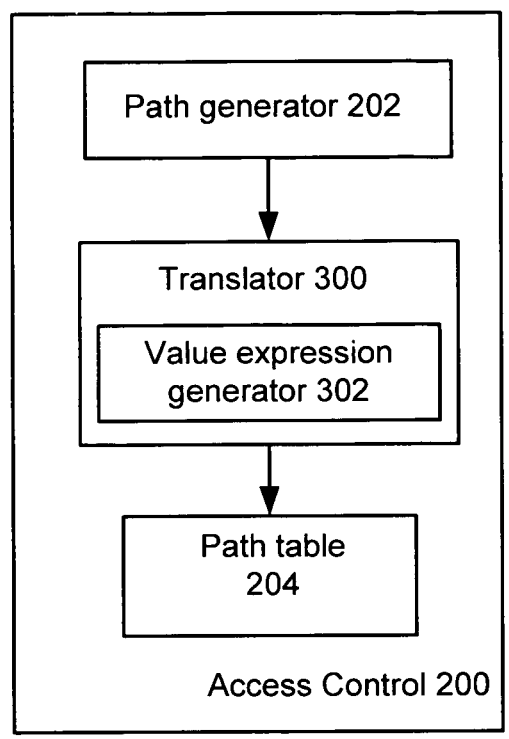
FIG. 2 is a block diagram of the Access Control mechanism according to the preferred embodiment of the present invention.

FIG. 2 is a block diagram of the Access Control mechanism 200 according to the preferred embodiment of the present invention. The Access Control mechanism 200 comprises a path table generator 202, a translator 300 and a path table 204. Each component will be described in further detail in conjunction with FIG. 3.

Figure 3:
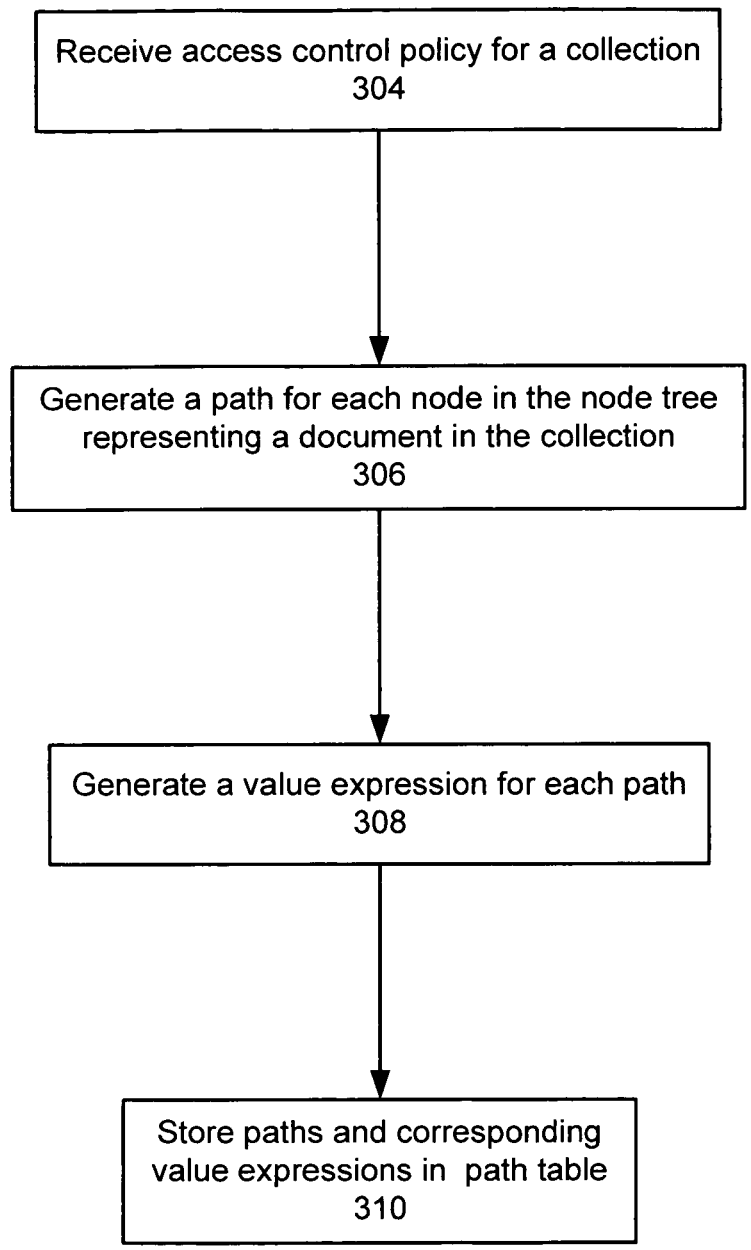
FIG. 3 is a flowchart illustrating a process for providing path-level access control to structured documents stored in a database according to a preferred embodiment of the present invention.

FIG. 3 is a flowchart illustrating a method for providing path-level access control to structured documents stored in the database according to a preferred embodiment of the present invention. In step 304, the Access Control mechanism 200 receives or retrieves an access control policy 107 pertaining to a collection of structured documents. In a preferred embodiment, the Access Control mechanism 200 receives the control policy 107 immediately after the administrator 108 has written and validated it. In another preferred embodiment, the control policy 107 can be stored in a repository in the DBMS 105, and retrieved by the Access Control mechanism 200 at a time after authorship.

The access control policy 107 for the collection comprises a plurality of access control rules. Each access control rule typically defines a subject to which the rule applies, an action and a path. The subject can be a user's name or a group of users. The action can be, but is not limited to, a read, an update, a create or a delete action. The path identifies the node to which the rule applies. For example, the following access control rule:

</bib/book/title, {Murata}, +read> provides that the user Murata is allowed to read information at the title element node described by the path "/bib/book/title." The access control rule can also include predicates such that access to a particular node can be data-dependent. The access control rules are presumably syntactically correct and logically valid when they are received by the Access Control mechanism 200. Alternatively, the Access Control mechanism 200 can be configured to evaluate the access control policy 107 and validate it.

Referring again to FIG. 3, once the access control policy 107 has been received by the Access Control mechanism 200, the path generator 202 generates a path for each node in a node tree representing a structured document in the collection in step 306. As stated above, it is well known to those skilled in the art that a structured document can be represented as a plurality of nodes forming a hierarchical node tree. Thus, for example, suppose a structured document, S1, is as follows:

```
<Questionnaire>
    <Name> Alice </Name>
    <Questions>
        <Q1> Yes </Q1>
        <Q2> No </Q2>
    </Questions>
<Questionnaire>
```

The node tree would comprise the following element nodes:

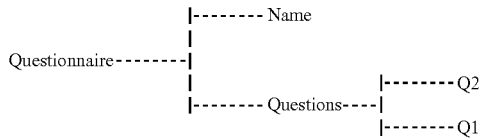

The path to element node Q1 is:
/Questionnaire/Questions/Q1

Referring again to FIG. 3, once the paths have been generated, the access control policy 107 and paths are passed to the translator 300, where in step 308, a value expression for each path is generated. In a preferred embodiment, the value expression for a path is an executable statement regarding who, if anyone, has access to the node associated with the path. The value expression represents a combination of all access control rules that affect the node. The process by which the translator 300 generates the value expressions is illustrated in FIG. 4.

Figure 4:
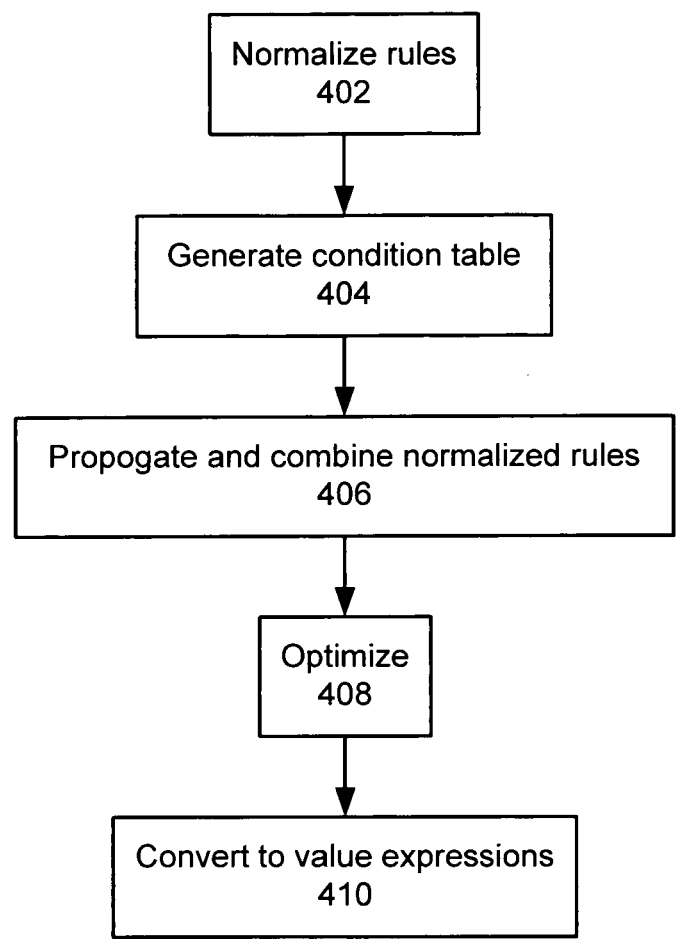
FIG. 4 is a flowchart illustrating a process for generating value expressions according to a preferred embodiment of the present invention.

Referring now to FIG. 4, the process begins by normalizing each of the access control rules that make up the access control policy 107 in step 402. In a preferred embodiment, each access control rule is transformed into a normalized rule format that includes a head, a path expression, and a condition. The head indicates whether an action is granted or denied, the path expression describes the path associated with the node, and the condition indicates to whom the rule applies and under what circumstances. For example, the following access control rule:

</bib/book[@title="security"], GROUP Admin, +read> is transformed into:

(grant_read, '/bib/book', equal($Group, Admin) & xpath(/bib/book[@title="security"])

The above format is called a normalized rule. After this step is finished, a set of normalized access control rules is generated.

Next, in step 404, the translator 300 generates and populates a condition table. FIG. 5 illustrates a condition table 500 according to a preferred embodiment of the present invention. The condition table 500 comprises a ConditionID column 502 and a Condition Expression column 504. The Condition Expression column 504 contains the third argument of each normalized rule, i.e., the condition, while the ConditionID column 502 contains an identifier associated with the condition. The translator 300 replaces the third argument of each normalized rule with the ConditionID corresponding to the condition to form a modified normalized rule.

Referring again to FIG. 4, after the condition table has been generated, the translator 300 propagates each modified normalized rule through each path generated by the path generator 202 (in step 306 of FIG. 3) in step 406. Propagation refers to how an access control rule associated with a particular node affects access to ancestor and descendant nodes. In general, propagation has two modes: up and down. Propagation-up refers to when an access control rule associated with a particular node propagates upward toward its ancestor nodes, while propagation-down refers to when an access control rule propagates downward toward its descendant nodes. Whether an access control rule propagates up or down depends on a set of propagation rules. The following table illustrates a set of propagation rules according a preferred embodiment of the present invention:

TABLE 1

| Action | Effect | Mode | Semantics |
|---|---|---|---|
| Read | Grant | Down | Rule specified to any node propagates down. |
| | | Up | Every GRANT for read-access propagates up to all ancestor elements (but not including the attributes and text nodes of these ancestor elements). |
| | Deny | Down | Rule specified to any node propagates down. |
| | | Up | No propagation |
| Update | Grant | Down | Every GRANT for update-access propagates down to all the attributes and text nodes. |
| | | Up | No propagation |
| | Deny | Down | No propagation |
| | | Up | No propagation |
| Create | Grant | Down | No propagation |
| | | Up | No propagation |
| | Deny | Down | No propagation |
| | | Up | No propagation |
| Delete | Grant | Down | No propagation |
| | | Up | No propagation |
| | Deny | Down | No propagation |
| | | Up | No propagation |

The propagation rules above are illustrative and not exclusive. Those skilled in the art recognize that different propagation rules can be implemented, and that the method and system of the present invention is not limited thereby.

In step 406, for each modified normalized rule, the translator 300 applies the propagation rules and identifies each path that is affected by the modified normalized rule. For example, if the modified normalized rule associated with a node is a "GRANT read" to user A, the modified normalized rule propagates up and down from the node. User A has "read" access to all descendant nodes and to all ancestor element nodes. Thus, the translator 300 identifies the paths associated with the descendant and ancestor element nodes as being accessible by user A. If more than one modified normalized rule affects a particular path, those rules are combined for the path in step 406.

Next, in step 408, the translator 300 optimizes the rules by minimizing repeated value expressions in the output. In a preferred embodiment, reference notations and supplemental value expressions are used to optimize the rules. For the reference notation, the translator 300 compares the ConditionID specified for a path associated with a node to the ConditionID of the path associated with its parent node. If the ConditionIDs are identical, then the ConditionID in the child node is replaced with "ref(1, . . . /)" indicating that the condition for the child node is identical to the condition of the parent node and therefore, there is no need to reevaluate the value expression for the child. In the case of a sibling reference, "ref(2, . . . /sibling-node)" is used to express the reference while " . . . /sibling-node" is the relative path.

A supplemental value expression is an additional value expression associated with a path that describes the access rule for any descendant path that exists or may exist in the future. For example, if user B has read access on path "a/b," then according to the propagation rules presented in Table 1, user B has read access to any descendant path associated with a node (descendant path/node) under "a/b." A descendant path/node may exist (i.e., a path and value expression has been generated for the descendent node) or it may not yet exist because, for example, a document containing this path has not yet been added to the collection and processed by the Access Control mechanism 200. In this case, the translator 300 generates a supplemental value expression for path "a/b" that indicates that user B has read access to any descendant path/node. Thus, if and when a new descendant path/node is introduced, there is no need to generate a value expression for the new path.

Those skilled in the art will readily appreciate that utilizing reference notations and supplemental value expressions are but two ways to optimize the rules. Other techniques can be utilized to further optimize the rules.

After optimization, a value expression generator 302 transforms each modified normalized access control rule into a value expression for the path, via step 410. In a preferred embodiment, the value expression generator 302 does two things: a syntactical conversion and an addition of a "!p" notation. For the syntactical conversion, each condition expression is transformed into syntax defined as XPath step qualifier. For example, a condition expression:

equal($Group, Admin) & xpath(/bib/book[@year=2000])

is transformed into:

[$Group='Admin' and @year=2000] for the path "/bib/book".

For the "!p" notation, the value expression generator 304 generates "!p" notation wherever the reference notation is specified. For example, if ref(1, . . . /) is specified at "/bib/book/title", then the value expression is extended to "if !p then [ref(1, . . . /)]". When compiled and executed, the "!p" notation indicates to the DBMS 105 that the value expression for that path is the same as that for the path of the parent node and therefore, the DBMS 105 does not need to reevaluate the value expression if access to the parent has already been granted. After step 410 is finished, a value expression is generated for each path.

The above described value expression generation process can further be described through the following simple example. Suppose the following XML document is representative of a collection:

```
<bib ver="1.0">
  <book year="1994">
    <title>TCP/IP Illustrated</title>
    <author>Alice</author>
  </book>
  <book year="2002">
    <title>Advanced Programming in the Java environment</title>
  </book>
</bib>
``` and the following rules make up the access control policy for the collection:

Rule 1: </bib, {Murata}, +read>
Rule 2: </bib/@ver, {Seki}, +read>
Rule 3: </bib/book, {Hada}, −read>
Rule 4: </bib/book/title, {Tozawa}, +read>

Rule Normalization (Step 402)

Here, rules 1-4 are transformed into normalized rules. Each normalized rule includes a head, a path expression and a condition. The normalized rules are as follows:

Rule 1 : (grant_read, /bib, equal($User, Murata))
Rule 2 : (grant_read, /bib/@ver, equal($User, Seki))
Rule 3 : (deny_read, /bib/book, equal($User, Hada))
Rule 4 : (grant_read, /bib/book/title, equal($User, Tozawa))

Condition Table Generation (Step 404)

Next, the translator 300 generates and populates the following condition table:

| ConditionID | Condition Expression |
| --- | --- |
| C1 | equal($User, Murata) |
| C2 | equal($User, Seki) |
| C3 | equal($User, Hada) |
| C4 | equal($User, Tozawa) |

The translator 300 then converts the normalized rules into the following modified normalized rules:

Rule 1 : (grant_read, /bib, C1)
Rule 2 : (grant_read, /bib/@ver, C2)
Rule 3 : (deny_read, /bib/book, C3)
Rule 4 : (grant_read, /bib/book/title, C4)

Rule Propagation and Combination (Step 406):

Here, each rule is propagated through each path in the node tree (generated by the path generator 202 in step 306 of FIG. 3) according to the propagation rules in Table 1 above. The output of the propagation of the rule through a path is a statement indicating whether a user is granted or denied access to the path, and in turn, to the node. Thus, when each rule is propagated through each path making up the representative document, the resulting evaluation can be presented as follows:

| Rule 1 (grant_read, /bib, C1) | |
| --- | --- |
| /bib | : C1 |
| /bib/@ver | : C1 |
| /bib/text( ) | : C1 |
| /bib/book | : C1 |
| /bib/book/text( ) | : C1 |
| /bib/book/@year | : C1 |
| /bib/book/title | : C1 |
| /bib/book/title/text( ) | : C1 |
| Rule 2 (grant_read, /bib/@ver, C2) | |
| /bib | : C1, C2 |
| /bib/@ver | : C1, C2 |
| /bib/text( ) | : C1 |
| /bib/book | : C1 |
| /bib/book/text( ) | : C1 |
| /bib/book/@year | : C1 |
| /bib/book/title | : C1 |
| /bib/book/title/text( ) | : C1 |
| Rule 3 (deny_read, /bib/book, C3) | |

-continued

| | |
|---|---|
| /bib | : C1, C2 |
| /bib/@ver | : C1, C2 |
| /bib/text( ) | : C1 |
| /bib/book | : C1, {C3} |
| /bib/book/text( ) | : C1, {C3} |
| /bib/book/@year | : C1, {C3} |
| /bib/book/title | : C1, {C3} |
| /bib/book/title/text( ) | : C1, {C3} |

Rule 4 (grant_read, /bib/book/title, C4)

| | |
|---|---|
| /bib | : C1, C2, C4 |
| /bib/@ver | : C1 |
| /bib/text( ) | : C1, C2 |
| /bib/book | : C1, C4, {C3} |
| /bib/book/text( ) | : C1, {C3} |
| /bib/book/@year | : C1, {C3} |
| /bib/book/title | : C1, C4, {C3} |
| /bib/book/title/text( ) | : C1, C4, {C3} |

Note: { } indicates that a condition inside the parenthesis implies negative permission.

Optimization (Step 408)

Here, reference notations are used to minimize repetitive outputs.

| | |
|---|---|
| /bib | : C1\|C2\|C4 |
| /bib/@ver | : C1 |
| /bib/text( ) | : C1\|C2 |
| /bib/book | : (C1\|C4)&!C3 |
| /bib/book/text( ) | : C1&!C3 |
| /bib/book/@year | : C1&!C3 |
| /bib/book/title | : ref(1, ../) |
| /bib/book/title/text( ) | : ref(1, ../../) |

Value Expression Generation (Step 410)

Here, each output statement is transformed into a value expression based on the condition expression in the condition table. A value expression is created for each path.

| | |
|---|---|
| /bib | : [$User='Murata' or $User='Seki' or $User='Tozawa'] |
| /bib/@ver | : [$User='Murata'] |
| /bib/text( ) | : [$User='Murata' or $User='Seki'] |
| /bib/book | : [($User='Murata' or $User='Tozawa') and not($User='Hada')] |
| /bib/book/text( ) | : [$User='Murata' and not($User='Hada')] |
| /bib/book/@year | : [$User='Murata' and not($User='Hada')] |
| /bib/book/title | : if !p then [ref(1, ../)] |
| /bib/book/title/text( ) | : if !p then [ref(1, ../../)] |

Referring again to FIG. 3, after the value expressions have been generated, the Access Control mechanism 200 stores the paths and corresponding value expressions in the path table 204 in step 310. FIG. 6 illustrates a path table 600 for the collection of documents and the access control policy according to the example described above. As is shown, the table 600 comprises a path column 602 and a value expression column 604. The path column 602 contains the path to each node in the structured document and the value expression column 604 contains the value expression. In a preferred embodiment of the present invention, the value expressions are compiled before they are stored in the path table 204. The result is a set of mini-plans that can be efficiently executed by the DBMS 105 at runtime to perform access control checking.

Figure 7:
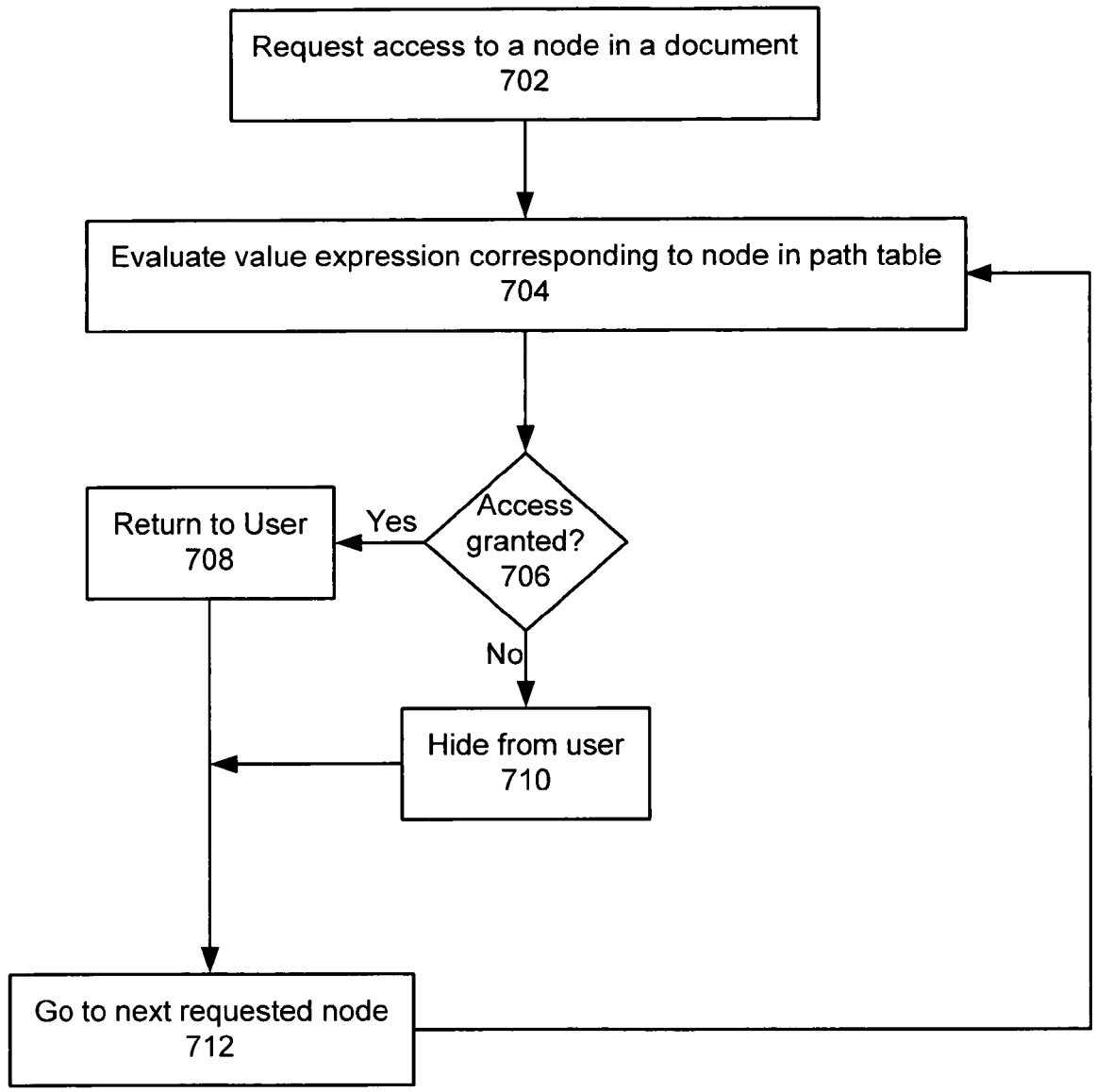
FIG. 7 is a flowchart illustrating a process for utilizing value expressions during access control evaluation according to a preferred embodiment of the present invention.

To describe further how the value expressions are utilized by the DBMS 105 during access control evaluation at runtime, please refer now to FIG. 7, which is a flowchart illustrating a process 700 for utilizing value expressions according to a preferred embodiment of the present invention. The process begins in step 702 when a user requests access, e.g., to read, to a node in a structured document in a collection. The request is typically in the form of a query that is written in Xquery or any other query language appropriate for querying structured documents. Typically, the DBMS 105 compiles the query during compile time and then executes the compiled query during run time. The DBMS 105 returns the structured document(s), or portions thereof, satisfying the query.

According to a preferred embodiment of the present invention, during the execution of the query (during run time), the DBMS 105 performs an access control check to determine whether the user is authorized to access the requested node. The DBMS 105 does this by accessing the path table 204 in the Access Control mechanism 200 and evaluating the value expression corresponding to the path for the requested node in step 704. If the value expression indicates that access is granted to the user (step 706), the DBMS 105 returns the document with the requested data viewable to the user in step 708. If, however, access is denied, the DBMS 105 returns the document with the requested data hidden from the user in step 710. In step 712, a next requested node is evaluated and steps 704 to 710 are repeated.

According to the preferred embodiment of the present invention, the Access Control mechanism 200 of the present invention controls how the structured document appears to the user when it is returned in a result set. The data to which the user is granted access is displayed, whereas that to which the user is denied access is hidden. Thus, path-level access control prevents the user from gaining access to portions of a document. For example, consider the representative document used in the example above and the access control rules (Rules 1-4) associated therewith. A request from user Hada to read the document (/bib) would result in the following output:

<bib ver="1.0">
</bib>.

The paths "/bib/book," "/bib/book/text( )," "/bib/book/@year," "/bib/book/title" and "/bib/book/title/text( )" are hidden from user Hada because Rule 3 denies Hada read access to the path "/bib/book."

Through the aspects of the present invention, path-level access control to a structured document in a collection is improved by transforming an access control policy for the collection into a set of value expressions. According to the preferred embodiment of the present invention, one value expression is generated for each path associated with a node in the structured document. The value expression is a simple statement indicating who, if anyone, has access to the node associated with the path.

Thus, during access control evaluation, the DBMS 105 checks the value expression corresponding to the requested node/path, as opposed to evaluating the access control policy.

By evaluating value expressions instead of the access control policy, access control evaluation is more efficient and fast. Moreover, because access control evaluation is performed during run time, as opposed to compile time, changes to security can be implemented without recompiling the query. In addition, by performing access control evaluation during run time, the DBMS 105 is able to hide data in a document. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for controlling access to structured documents, the method comprising:
   providing an access control policy for a structured document comprising a plurality of nodes, wherein the access control policy comprises a plurality of access control rules;
   generating a path for each of the plurality of nodes in the structured document; and
   generating an executable value expression for each path by normalizing the plurality of access control rules into a format comprising a head, a path, and a condition that indicates who is granted or denied access to each path, generating and populating a condition table to convert the plurality of normalized access control rules into a plurality of modified normalized access control rules, propagating the plurality of modified normalized access control rules for each generated path to identify at least one generated path that is affected by at least one of the plurality of modified normalized access control rules, combining at least two modified normalized access control rules of the plurality of modified normalized access control rules if the at least two modified normalized access control rules affect a particular generated path, optimizing the plurality of modified normalized access control rules by eliminating repeated value expressions, and transforming the plurality of modified normalized access control rules into the executable value expression for each path based on the condition, wherein the executable value expression is utilized during access control evaluation to determine whether a user is allowed to access at least one of the plurality of nodes in the structured document.

2. The method of claim 1, further comprising:
   storing each path and corresponding generated value expression in a table.

3. The method of claim 2, further comprising:
   prior to the storing, compiling each generated value expression.

4. The method of claim 3, wherein the compiling further comprises:
   receiving a query from the user, wherein the query requests access to a node in the structured document;
   executing the query;
   evaluating the value expression corresponding to the path associated with the requested node;
   displaying data associated with the requested node if the value expression grants access to the user; and
   hiding data associated with the requested node if the value expression denies access to the user.

5. The method of claim 4, wherein the evaluating is performed during a run time.

6. The method of claim 2, further comprising:
   replacing the value expression for a path associated with a node with a reference notation if the value expression is identical to that for a path associated with the node's parent, thereby eliminating repeated value expressions in the table.

7. The method of claim 1, wherein the generating the value expression for each path further comprises:
   propagating each of the plurality of normalized access control rules through each path such that access to each path is defined by at least one normalized access control rule; and
   transforming each of the at least one normalized access control rules affecting each path into a statement indicating who is granted and denied access to the path.

8. The method of claim 1, wherein the providing further comprises:
   writing the plurality of access control rules; and
   validating the plurality of access control rules such that the resulting rules are syntactically and logically valid.

9. The method of claim 1, wherein the structured document is written in Extensible Markup Language.

10. A non-transitory computer readable medium encoded with a computer program for controlling access to structured documents, the computer program comprising instructions for:
    providing an access control policy for a structured document comprising a plurality of nodes, wherein the access control policy comprises a plurality of access control rules;
    generating a path for each of the plurality of nodes in the structured document; and
    generating an executable value expression for each path by normalizing the plurality of access control rules into a format comprising a head, a path, and a condition that indicates who is granted or denied access to each path, generating and populating a condition table to convert the plurality of normalized access control rules into a plurality of modified normalized access control rules, propagating the plurality of modified normalized access control rules for each generated path to identify at least one generated path that is affected by at least one of the plurality of modified normalized access control rules, combining at least two modified normalized access control rules of the plurality of modified normalized access control rules if the at least two modified normalized access control rules affect a particular generated path, optimizing the plurality of modified normalized access control rules by eliminating repeated value expressions, and transforming the plurality of modified normalized access control rules into the executable value expression for each path based on the condition, wherein the executable value expression is utilized during access control evaluation to determine whether a user is allowed to access at least one of the plurality of nodes in the structured document.

11. The computer readable medium of claim 10, further comprising computer program instructions for:
    storing each path and corresponding generated value expression in a table.

12. The computer readable medium of claim 11, further comprising computer program instructions for:
    prior to the storing, compiling each generated value expression.

13. The computer readable medium of claim 12, further comprising computer program instructions for:
    receiving a query from the user, wherein the query requests access to a node in the structured document;
    executing the query;
    evaluating the value expression corresponding to the path associated with the requested node;
    displaying data associated with the requested node if the value expression grants access to the user; and
    hiding data associated with the requested node if the value expression denies access to the user.

14. The computer readable medium of claim 13, wherein the evaluating is performed during a run time.

15. The computer readable medium of claim 11, further comprising computer program instructions for:
    replacing the value expression for a path associated with a node with a reference notation if the value expression is identical to that for a path associated with the node's parent, thereby eliminating repeated value expressions in the table.

16. The computer readable medium of claim 10, wherein the computer program instructions for generating the value expression for each path further comprises computer program instructions for:
    propagating each of the plurality of normalized access control rules through each path such that access to each path is defined by at least one normalized access control rule; and
    transforming each of the at least one normalized access control rules affecting each path into a statement indicating who is granted and denied access to the path.

17. The computer readable medium of claim 10, wherein the computer program instructions for providing further comprises computer program instructions for:
    writing the plurality of access control rules; and
    validating the plurality of access control rules such that the resulting rules are syntactically and logically valid.

18. The computer readable medium of claim 10, wherein the structured document is written in Extensible Markup Language.

19. A computer system for controlling access to structured documents, the computer system comprising:
    a database management system implemented on the computer system;
    the data management system including a processor for executing instructions on the computer system, the database management system comprising:
    an access control policy for a structured document, wherein the structured document comprises a plurality of nodes and the access control policy comprises a plurality of access control rules, and
    an access control mechanism configured to:
    generate a path for each of the plurality of nodes in the structured document and
    generate an executable value expression for each path by normalizing the plurality of access control rules into a format comprising a head, a path, and a condition that indicates who is granted or denied access to each path, generating and populating a condition table to convert the plurality of normalized access control rules into a plurality of modified normalized access control rules, propagating the plurality of modified normalized access control rules for each generated path to identify at least one generated path that is affected by at least one of the plurality of modified normalized access control rules, combining at least two modified normalized access control rules of the plurality of modified normalized access control rules if the at least two modified normalized access control rules affect a particular generated path, optimizing the plurality of modified normalized access control rules by eliminating repeated value expressions, and transforming the plurality of modified normalized access control rules into the executable value expression for each path based on the condition, wherein the executable value expression is utilized during access control evaluation to determine whether a user is allowed to access at least one of the plurality of nodes in the structured document.

20. The computer system of claim 19, wherein the access control mechanism is configured to store each path and corresponding generated value expression in a table.

21. The computer system of claim 20, wherein the database management system further comprises a compiler configured to compile each generated value expression prior to the storage.

22. The computer system of claim 21, wherein the compiler further receives a query from the user, wherein the query requests access to a node in the structured document, executes the query, evaluates the value expression corresponding to the path associated with the requested node, displays data associated with the requested node if the value expression grants access to the user, and hides data associated with the requested node if the value expression denies access to the user.

23. The computer system of claim 22, wherein access control evaluation is performed during a run time.

24. The computer system of claim 19, wherein the access control mechanism comprises:
    a translator propagating each of the plurality of access control rules through each path such that access to each path is defined by at least one access control rule; and
    a value expression generator for transforming each of the at least one access control rules associated with each path into a statement indicating who is granted and denied access to the path.

25. The computer system of claim 19, wherein the access control rules are syntactically and logically valid.

26. The computer system of claim 19, wherein the structured document is written in Extensible Markup Language.

* * * * *